(12) United States Patent
van den Berg et al.

(10) Patent No.: US 12,443,693 B2
(45) Date of Patent: Oct. 14, 2025

(54) AUTHORIZER FOR OPERATIONS OF A VIRTUAL TERMINAL

(71) Applicant: Apple Inc., Cupertino, CA (US)

(72) Inventors: Frank Andries van den Berg, San Jose, CA (US); Rahul Narayan Singh, Santa Clara, CA (US); Robin Burel, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 187 days.

(21) Appl. No.: 18/374,482

(22) Filed: Sep. 28, 2023

(65) Prior Publication Data

US 2025/0111031 A1 Apr. 3, 2025

(51) Int. Cl.
*G06F 21/44* (2013.01)
*G06Q 20/00* (2012.01)
*G06Q 20/40* (2012.01)

(52) U.S. Cl.
CPC .......... *G06F 21/44* (2013.01); *G06Q 20/00* (2013.01); *G06Q 20/409* (2013.01)

(58) Field of Classification Search
CPC ....... G06F 21/44; G06Q 20/00; G06Q 20/409
See application file for complete search history.

(56) References Cited

U.S. PATENT DOCUMENTS

| | | | | |
|---|---|---|---|---|
| 2015/0134540 A1* | 5/2015 | Law | .................... | G06Q 20/385 |
| | | | | 705/72 |
| 2015/0161597 A1* | 6/2015 | Subramanian | ....... | G06Q 20/204 |
| | | | | 705/41 |
| 2015/0186879 A1* | 7/2015 | Ortiz | .................. | G06Q 20/3223 |
| | | | | 705/76 |
| 2015/0206136 A1* | 7/2015 | Maddocks | ......... | G06Q 20/4014 |
| | | | | 705/71 |
| 2015/0287031 A1* | 10/2015 | Radu | .................... | G06Q 20/204 |
| | | | | 705/18 |
| 2016/0019536 A1* | 1/2016 | Ortiz | ...................... | G06Q 20/36 |
| | | | | 705/67 |
| 2016/0092876 A1* | 3/2016 | Kamal | ............. | G06Q 20/40145 |
| | | | | 705/44 |
| 2016/0135048 A1* | 5/2016 | Huxham | ............. | H04L 63/0442 |
| | | | | 455/411 |
| 2016/0253664 A1* | 9/2016 | Yuan | .................. | G06Q 20/3226 |
| | | | | 705/71 |
| 2018/0165673 A1* | 6/2018 | Francis | .................... | H04W 4/80 |
| 2018/0367311 A1* | 12/2018 | Stahlberg | ............. | H04L 9/3234 |

(Continued)

OTHER PUBLICATIONS

Apple, Inc. (May 13, 2022). Apple Platform Security: Apple Pay Component Security. https://support.apple.com/guide/security/apple-pay-component-security-sec2561eb018/web (Year: 2022).*

(Continued)

*Primary Examiner* — Philip J Chea
*Assistant Examiner* — Dorianne Alvarado David
(74) *Attorney, Agent, or Firm* — Kilpatrick Townsend & Stockton LLP

(57) ABSTRACT

Techniques for using an authorizer in a virtual terminal on a multipurpose device to authorize operations of a cryptographic applet in a secure element associated with the multipurpose device are described herein. These techniques include receiving an authorization token and setting authorization criteria for the operation of the cryptographic applet based on the authorization token.

13 Claims, 8 Drawing Sheets

(56) References Cited

U.S. PATENT DOCUMENTS

| | | | | |
|---|---|---|---|---|
| 2020/0154270 A1* | 5/2020 | Byington | .................. | G06F 8/30 |
| 2021/0211293 A1* | 7/2021 | Varvarezis | ............ | H04L 9/3215 |
| 2021/0256518 A1* | 8/2021 | Shastry | ............ | G06Q 20/38215 |
| 2022/0006794 A1* | 1/2022 | Amar | .................... | H04L 67/303 |
| 2022/0045861 A1* | 2/2022 | Ortiz | .................... | H04L 9/3239 |
| 2022/0366413 A1* | 11/2022 | Salminen | ............. | G06Q 20/204 |
| 2023/0124498 A1* | 4/2023 | Agrawal | ................ | G06F 21/57 |
| | | | | 713/194 |
| 2023/0368190 A1* | 11/2023 | Baruvoori | .......... | G06Q 20/4097 |

OTHER PUBLICATIONS

Li, Q., Zhang, X., Seifert, J.P. and Zhong, H., Oct. 2008. Secure mobile payment via trusted computing. In 2008 Third Asia-Pacific Trusted Infrastructure Technologies Conference (pp. 98-112). IEEE. (Year: 2008).*

Liu, W., Wang, X. and Peng, W., 2020. State of the art: secure mobile payment. IEEE Access, 8, pp. 13898-13914. (Year: 2020).*

Solat, S., 2017. Security of electronic payment systems: a comprehensive survey. arXiv preprint arXiv:1701.04556. (Year: 2017).*

* cited by examiner

AUTHORIZER FOR OPERATIONS OF A VIRTUAL TERMINAL

CROSS-REFERENCES TO RELATED APPLICATIONS

This application is related to U.S. patent application Ser. No. 18/374,414 filed Sep. 28, 2023 entitled, "SECURE PIN ENTRY USING A VIRTUAL TERMINAL," the contents of which are herein incorporated by reference.

BACKGROUND

Electronic devices, especially portable electronic user devices, are quickly becoming ubiquitous in every modern society. Such devices can be used as terminals to transmit data with one another. Transmitted data can require encryption and decryption to protect sensitive data. Authorization to perform operations by the secure element of a user device can be used to increase data security for encryption and decryption of sensitive data.

DETAILED DESCRIPTION

Figure 1:
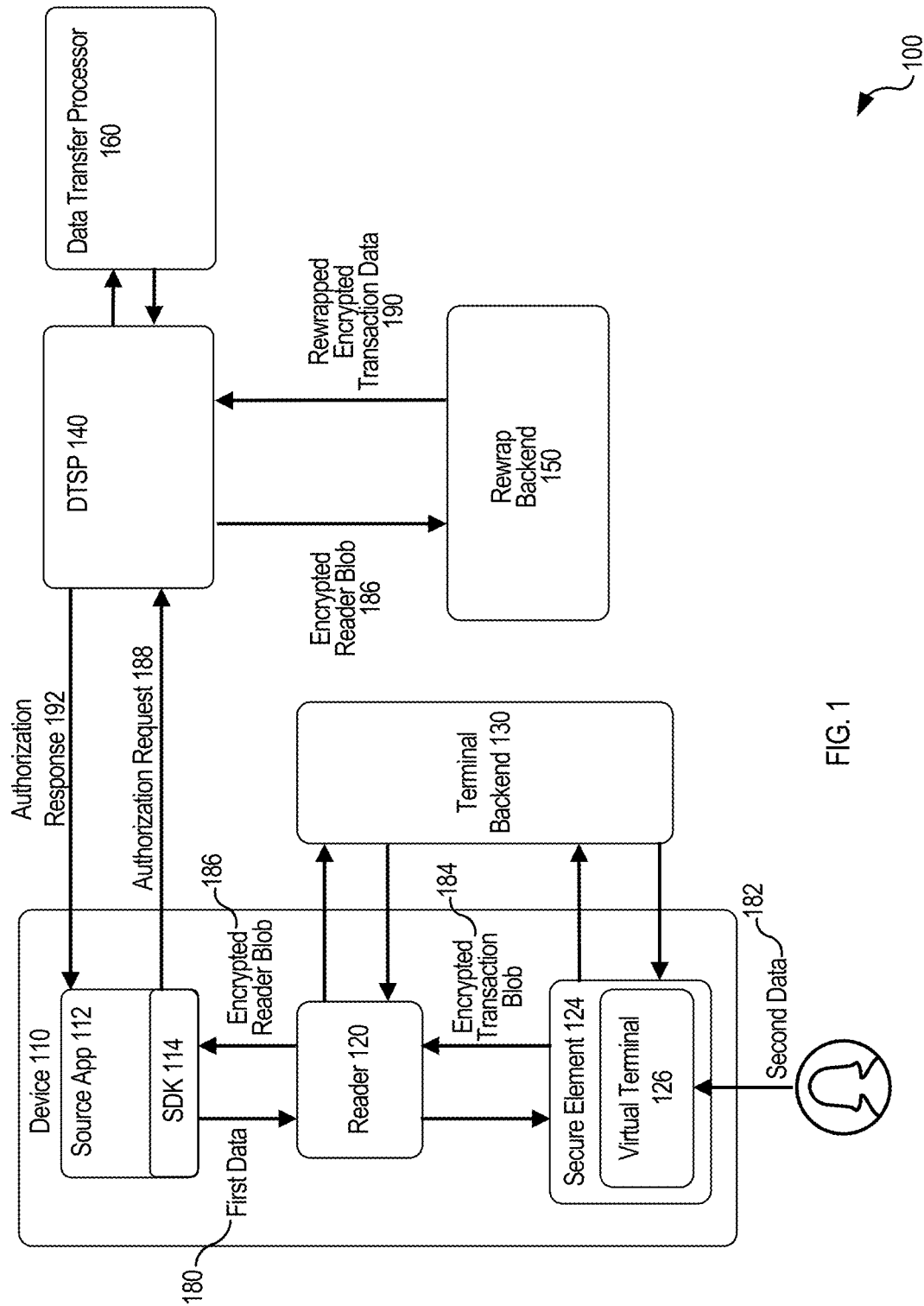
FIG. 1 illustrates a block diagram for performing the techniques described herein, according to an embodiment of the present disclosure.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable media that provide techniques for authorizing data transfer operations of a virtual terminal hosted by (e.g., executed from within) a secure element. The secure element is integrated into a multipurpose user device. Unlike conventional data transfer schemes, the techniques described herein enable authorization controls for operations of the secure element on a multipurpose device (for example, a mobile device, a smart phone, tablet, etc.). An authorizer application executed within the secure element can receive a token from a backend server that enables particular operations of the secure element. In this way, the authorizer application enables checks on the cryptographic operations and other operations of the secure element. The authorizer application enables data security features regarding the secure element that decreases potential data security and privacy concerns. A system including the virtual terminal can be configured to include a reader application (for example, a data reader application which serves the operating system of the multipurpose device as a hub for received information that can be used by data transfer-related applications and the secure element), an internal short-range data transceiver device (for example, an internal data reader such as a near-field communication ("NFC") chip) and a secure element. The short-range data transceiver device may not be a component of an externally connected device (for example, a dongle), but rather can be integrated into the multipurpose device. The multipurpose device may also include a secure element, e.g., a closely integrated hardware module designed for data security. The secure element may host the virtual terminal and data transfer information. The secure element may also not be a component of an externally connected device (for example, a dongle).

The techniques described herein provide for a mobile contactless data transfer device solution that enables users to perform secure data transfers using a virtual terminal on a multipurpose device (for example, a mobile device, a smart phone, tablet, etc.) that have been properly authorized by a backend server. Conventional data transfer systems require dedicated devices and/or hardware separate from the multipurpose device (for example, a dongle or terminal device). The virtual terminal can be configured to support a software-based terminal on the multipurpose device that removes the need for dedicated devices and/or hardware data transfers. The virtual terminal can be hosted by the secure element. An authorizer application hosted by the secure element can be used to authorize operations of the secure element, for example, data transfer-related operations of the virtual terminal. The authorizer application can be used to generate a validation block that is authenticated by a backend server. The backend server can validate the validation block and send back an authorization token that sets authorization criteria in the authorizer application. When a cryptographic applet of the secure element is requested to perform an operation, the cryptographic applet can request authorization confirmation for the operation from the authorizer application. The authorizer application can communicate that the operation is authorized or not, enabling the cryptographic applet to perform the requested operation. The authorizer application can be used to monitor the health of the secure element and related systems/applications and reduce the opportunity for abuse of the secure element and its related cryptographic abilities. The authorizer application can also be used to enable mutual authentication systems that are performed locally (without the need of server services) between the secure element and a data transfer instrument. The authorizer application can be used to prevent unauthorized access and/or use of a key stored in the secure element. The mobile data transfer techniques can be enabled via (1) a third-party mobile data transfer application (the source application, also referred to as the source app) that integrates with a first-party (for example, corresponding to the specific device) data reader application on an application processor of the source's eligible mobile device using one or more application programming interfaces ("API(s)") (collectively, the frontend integration) and (2) third-party data transfer systems that integrate with a backend platform (the backend platform) using APIs (collectively, the backend integration). Two separate suites of APIs can be provided: one for the third-party developers of source apps and one for the data transfer service providers ("DTSP(s)") that contract with the developers of source apps to facilitate the processing of transactions. The source application can be source-facing and enable sources to accept contactless data transfers from users using either digital or physical closed loop transaction instruments or open loop data transfer instruments.

In some examples, a source application on the multipurpose device may receive a command via a user interface of the multipurpose device to perform an operation that includes the use of an operation by a corresponding cryptographic applet in the secure element. In order to perform the operation of the cryptographic applet, authorization may be needed via the authorizer application in the secure element. The authorizer application can be initialized in relation to the operation as discussed herein. The source application can send an operation authorization request to the DTSP to perform the operation. The DTSP can authenticate the operation authorization request as originating from a valid source application and/or device. The DTSP can send a DTSP authorization token to the source application. The source application can transmit the DTSP authorization token to the reader application and request initialization of the authorizer application in the secure element. The reader application can generate a validation block which includes the DTSP authorization token and device metrics. The reader application can send the validation block with an authorization token request to the server backend. The server backend can authenticate the authorization token request as originating from a valid reader application and/or device and has been authorized by the DTSP. The server backend can generate the authorization token which includes authorization criteria. The server backend can send the authorization token such that the authorization token can be received by the authorizer application, which can set authorization criteria related to the operation. This process can be referred to as initializing the authorizer application in relation to the operation.

In some examples, after the authorizer application has been initialized in relation to the operation, the source application and/or the reader application can receive a command to perform the operation. The reader application can receive encrypted instrument data. The reader application can transmit the encrypted instrument data and a request to perform the operation to the cryptographic applet corresponding to the source application. The cryptographic applet can request the authorization status for the operation from the authorizer application. The authorizer application can check if the authorization criteria are met in relation to the operation. The authorizer application can send the authorization status to the cryptographic applet. If the authorization status is "not authorized" then the cryptographic applet may not perform the operation and may send an indication that the operation was not authorized to the reader. If the authorization status is "authorized" then the cryptographic applet can perform the operation.

Information pertaining to the source's day-to-day business operations (for example, user authorizations and transaction histories) would be transmitted directly from the DTSP's data transfer system to the source app and may not go through the backend platform.

Turning now to the figures, FIG. 1 illustrates an example block diagram 100 with example systems and components for implementing the virtual terminal techniques described herein. The device 110 (also referred to as the multipurpose device) includes a source application 112 (for example, an application, also referred to as the "source app") which interacts with an SDK 114 in order to send first data 180 to the reader 120 (also referred to as the reader application). The reader 120 can be a part of the operating system of the multipurpose device configured to receive information that can be used by data transfer-related third-party applications and the secure element. For example, the reader 120 can request information from the secure element on behalf of third-party applications (for example, the source application 112). Additionally, the reader 120 can transmit information received from different communication methods on the device to the secure element and/or third-party applications. For example, information received through a UI interface of the device or a transmission standard (for example, NFC, Bluetooth, WiFi, cellular connections, and the like) can be used to transmit information to the secure element and/or third-party applications. Prior to the receipt of the first data 180, the reader 120 can interact with the terminal backend 130 to initialize a virtual terminal 126. The virtual terminal 126 is hosted within a secure element 124. Any service or application, including the virtual terminal 126, that is hosted within a secure element 124 uses the processors and memories associated with the secure element 124. As such, the application processors and memories of the user device 110 may not be used by an application or service hosted by the secure element. The data and information of any service or application being hosted by the secure element can have data secured as described in relation to the secure element. The secure element 124 is a system designed for increase security as described herein. For example, the secure element 124 is a hardware module that specially designed for cryptography and data security of private and/or confidential data. The secure element 124 can be a hardware chip that runs a specific set of programs/applications, stores private and/or confidential data, and provides controlled access to the private and/or confidential data. The secure element 124 can provide the following set of features at a hardware level: 1) detection of hacking and/or data tampering attempts, 2) creation of a Root of Trust (ROT) platform for encryption and data security systems, 3) provision of secure memory for storing private encryption keys and private and/or confidential data, 4) cryptographically secure generation of random numbers, 5) generation of keys such as pairs of private and public keys for asymmetric encryption, and 6) secure monitoring of system resources such as detection of hardware configuration changes. The secure element 124 is separate from an application processor of the device 110. The secure element 124 receives the second data 182 which can detail how the data transfer can be provided to the source associated with the source application 112.

The virtual terminal 126 can generate transaction data using the first data 180 and the second data 182. In some examples, the transaction can be referred to as the data transfer. As described herein, the terms can be interchangeable in some instances. The secure element 124 (and the virtual terminal 126) can also communicate with a terminal backend 130 for various security and encryption features described herein in order to encrypt the transaction data. In some implementations, the secure element 124 communicates with the terminal backend 130 via the reader 120 wherein the communications are encrypted. The virtual terminal 126 can encrypt the transaction data using a transaction key only known by the virtual terminal 126 and/or the secure element 124. For example, the transaction key can be randomly generated at the time of the transaction by the virtual terminal 126. The transaction key is then encrypted by a rewrap backend public key (which corresponds to a rewrap backend private key held by the terminal backend 130 and/or the rewrap backend 150) as described herein. Thus, virtual terminal 126 has a transaction key encrypted by a rewrap backend public key and transaction data encrypted by the transaction key. The virtual terminal can generate an encrypted transaction blob 184 from the encrypted transaction key and the encrypted transaction data. The encrypted transaction blob 184 can include additional metadata. The use of the encrypted transaction blob 184 can prevent transaction data from being exposed outside the secure element 124 before the DTSP 140 can process the transaction data.

The virtual terminal 126 can then send the encrypted transaction blob 184 to the reader 120. The reader 120 can include additional metadata about the data transfer which is encrypted using a transport server key as described herein. The encrypted metadata (using the transport server key) and the encrypted transaction blob 184 are used to generate an encrypted reader blob 186. In some implementations, the encrypted transaction blob 184 can also be encrypted by the transport server key. The use of the encrypted transaction blob 184 can allow the rewrap backend 150 to verify the encrypted metadata to validate the transaction data without decrypting the transaction data encrypted by the transaction key. In some implementations, the combination of the reader 120, the secure element 124, and the virtual terminal 126 can be referred to as a virtual terminal system.

The reader 120 can send the encrypted reader blob 186 to the source application 112. The source application 112 can send the encrypted reader blob 186 with an authorization request 188 for the transaction to the data transfer service provider (DTSP) 140. The DTSP 140 may not be able to decrypt some or all of the encrypted reader blob 186 and sends it to the rewrap backend 150 for decryption. In some implementations, the rewrap backend 150 can decrypt the encrypted metadata of encrypted reader blob 186 using the transport server key (which corresponds to the transport server key) and verify various portions of the metadata in order to verify that the encrypted reader blob has been authorized by the DTSP 140, the source application 112, and/or the terminal backend 130 as described herein. This allows the rewrap backend 150 to verify the transaction and/or data transfer corresponding to the encrypted reader blob 186 (and associated encrypted transaction blob 184) without seeing the underlying unencrypted transaction data. This can ensure the privacy of the underlying transaction data as the source application 112 and rewrap backend 150 never unencrypt the transaction data encrypted by the transaction key. In some implementations, the rewrap backend 150 can also decrypt the encrypted transaction blob 184 inside to verify and validate various portions of additional metadata and transaction data.

Once the rewrap backend 150 has verified the metadata of the encrypted reader blob 186, the rewrap backend 150 can reencrypt the transaction key with a KEK, a symmetric key known by the DTSP such that the DTSP can decrypt the transaction key (using the KEK) and in turn decrypt the transaction data (using the transaction key). However, the transaction key is currently encrypted by the rewrap backend public key. The rewrap backend 150 can decrypt the transaction key using the rewrap backend private key (which corresponds to the rewrap backend public key). The rewrap backend 150 then reencrypts the transaction key with the KEK. In some implementations, the KEK of the rewrap backend 150 can be referred to as the rewrap KEK and the KEK of the DTSP 140 can be referred to as the DTSP KEK. In some implementations, the rewrap KEK and the DTSP KEK are symmetric keys that are essentially identical in functionality. The reencrypted transaction key can be referred to as the rewrapped transaction key. Reencrypting can be referred to as rewrapping.

The rewrap backend 150 then generates rewrapped encrypted transaction data 192 which includes the rewrapped transaction key and the encrypted transaction data. In some implementations, the rewrap backend 150 can generate rewrapped encrypted transaction data 192 by encrypting both the transaction key and the encrypted transaction data (encrypted by the transaction key) with the KEK (as described herein). In this way, the rewrap backend decrypts various forms of encryption and then reencrypts the transaction data. The rewrap backend 150 can send the rewrapped encrypted transaction data 190 to the DTSP 140.

The DTSP 140 can decrypt the rewrapped encrypted transaction data 190 using the KEK and then process the data transfer. In some examples, the data transfer service provider can work with data transfer processors 160 by sending the transaction data to the data transfer processors 160 for processing. An example data transfer processor can be a payment network operator. Another example data transfer processor can be an issuer of the instrument used for the data transfer. In some examples, the DTSP 140 can send the transaction data to the payment network operator who can send the transaction data to the issuer. For example, an instrument can be a credit card and the issuer can be a bank. Once the data transfer has been processed or authorized, the data transfer service provider 140 can send an authorization response 192 to the source application 112. This can indicate that the second data was verified and authorized, the transaction was authorized, and the transaction was completed.

In some cases, the source application 112 is a source-facing application that can be responsible for initializing a data transfer. An example source app is a merchant app which can be responsible for initializing a sale or payment. The source app can be used to generate first data 180. In some implementations, the first data 180 can include data regarding the cost of the transaction, a description of goods or services, description of the time and place of the transaction, and the like. Through the use of the SDK 114, the source application 112 can communicate with the reader 120 and initialize a virtual terminal 126. For example, when the user starts a transaction, the source application 112 can contact the reader 120 through the SDK 114. In the initialization of the virtual terminal 126, the reader 120 initializes a particular virtual terminal 126 that is associated with the source application 112 and the DTSP 140. As such a different virtual terminal 126 will need to be initialized in order to communicate with a different pair of a source application 112 and a DTSP 140.

In some examples, the source may be ready to start a transaction (for example, receive data transfers), so a user may press "start transaction." Some transactions may be related to payments such that a user (for example, a customer) can enter some value (for example, $10), and press "pay." In response to this, the system can contact the software development kit (SDK) 114, and call a function (for example, "transact"). In some examples, the SDK 114 is the implementation of the APIs noted above with respect to the frontend integration. Then, the SDK 114 can pass the first data to the reader 120.

Prior to the transaction, the reader 120 can be initialized and configured. The reader 120 can be specific to a particular pairing of source application 112 and DTSP 140. The reader 120 can then initiate an instrument reader. The instrument reader can be an application (for example, corresponding to a second application, where the source app is the first application) and can then take control of the user interface (UI) of the device 110, presenting an instrument reader UI. In some examples, the instrument reader UI can be presented on top of the source app UI, the instrument reader UI may display information to the user, that identifies the requested data value (for example, $10), the name of the source, and how/where to place their instrument (for example, where to tap the instrument of the user). In some implementations, the instrument reader is a card reader. In some cases, the source logo or a default logo (for example, based on Merchant Category Code (MCC)) can be displayed.

In some implementations, the instrument can be a payment instrument or card (for example, a credit card, digital wallet application containing digital payment information, etc.). In some implementations, the instrument can be read by an instrument reader and the second data 182 is sent to the secure element 124 for processing. In some implementations, the reader 120 never receives the second data 182. In some implementations, the reader 120 never receives the second data 182 in an unencrypted form.

The secure element 124 can receive both the first data 180 and the second data 182. The secure element 124 can be designed for data security and ensures the security and integrity of the transaction data as described herein. The secure element 124 can host the virtual terminal 126. The virtual terminal 126 can generate transaction data from the first data 180 and the second data 182. The virtual terminal 126 can apply several layers of security and encryption as described herein. The virtual terminal 126 can encrypt the transaction data with a key that is only known by the secure element 124, known as a transaction key. The transaction key can be randomly generated by the virtual terminal 126 at the time of the transaction. Then the secure element can use a rewrap backend public key to encrypt the transaction key. The virtual terminal 126 receives/generates the rewrap backend public key during initialization of the virtual terminal 126. The rewrap backend public key corresponds to a rewrap backend private key which is held by the terminal backend 130 and/or the rewrap backend 150. In some implementations, the rewrap backend public key is used to encrypt additional metadata. The encrypted transaction data (encrypted by the transaction key), the encrypted transaction key (encrypted by the rewrap backend public key) and the additional metadata are used to generate the encrypted transaction blob 184. The metadata can include various security and encryption information in addition to transaction data and can also be encrypted. The metadata can also include other data such as the description of the time and place of the transaction, the description and time of the encryption, and the like.

After the secure element 124 has generated the encrypted transaction blob 184, the encrypted transaction blob 184 (sometimes referred to as an encrypted blob) can be sent to the reader 120. The reader 120 can then add additional metadata and further encryption to generate the encrypted reader blob 186. The metadata can be used to verify the transaction. In some implementations, the metadata is encrypted by a transport server key while the encrypted transaction blob 184 may not be further encrypted. The transport server key can be generated during initialization of the reader 120 and corresponds to a transport server key which is held by the terminal backend 130 and/or the rewrap backend 150. The reader 120 can send the encrypted reader blob 186 to the source application 112, and the instrument reader application UI can close, leaving the source application running (and displayed on the UI), and the source application now has the encrypted reader blob 186. In some examples, the instrument reader application UI is closed once authorization for the transaction is received by the source application 112.

Because the encrypted transaction blob 184 was encrypted with a transaction key that is only known by the virtual terminal 126, the source application 112 and DTSP 140 may not be able to decrypt the transaction data. Further description of the encryption done by the virtual terminal 126 of the secure element 124 on the transaction data is described herein.

There are two system backends which work with the virtual terminal to encrypt and decrypt the transaction data. The system backends can provide security for data according to security standards (for example, the PCI CPoC Standard (collectively, the CPoC Validations)). The first backend can be referred to as the terminal backend 130 or the Contactless Payment on (Customer off-the-shelf Device (COTS)) (CPOC) (which can also be referred to as Mobile Payment on COD (MPOC) backend). The terminal backend 130 can also referred to herein as the instrument reader backend. In some implementations, the terminal backend 130 is configured to initialize the virtual terminal 126 before the data transfer (for example, of an instrument or other data transfer instrument). As part of the initialization, the terminal backend 130 can validate and/or perform many necessary initialization processes. These initialization processes can include verifying the virtual terminal token, generating the session token, sending the virtual terminal configuration to the secure element, running attestation checks, etc. as described herein.

The second backend can be referred to as the rewrap backend 150, the instrument data processor backend, or the data transfer rewrap backend. The rewrap backend 150, as described herein, handles the rewrap process which decrypts the encrypted reader blob 186 using a transport server key to examine the metadata within. Using the metadata, the rewrap backend is able to verify that the data transfer has been authorized by the DTSP 140, the source application 112, and/or the terminal backend 130. In addition to the metadata, the encrypted reader blob 186 also includes the encrypted transaction blob which has the encrypted transaction key (encrypted by the rewrap backend public key) and the encrypted transaction data (encrypted by the transaction key). The rewrap backend 150 can decrypt the encrypted transaction key (encrypted by the PAN Session public key) using a corresponding rewrap backend private key once the metadata has been verified. The rewrap backend 150 then reencrypts the transaction key using a KEK to generate a reencrypted transaction key. The reencrypted transaction key and the transport-key encrypted transaction data can be referred to as the rewrapped encrypted transaction data 190 that can be decrypted by the DTSP 140. Referring back to the virtual terminal 126 and related terminal backend 130, the terminal backend 130 works with the virtual terminal 126 to securely encrypt the transaction data in the secure element 124.

After receiving the encrypted reader blob 186 from the reader 120, the source application 112 can send the encrypted reader blob 186 with an authorization request 188 to the DTSP 140 in order to determine if the transaction is authorized. In some examples, the DTSP 140 may be the same entity, or controlled by the same entity, which created the source application 112; however, it could be a completely different entity. For example, a source may make an account on a source application 112, such that the source may not own the source app but uses the source app to facilitate data transfer and other data transfer concerns. The source application 112 may then be operated by the same or a different entity as the DTSP 140.

In some implementations, the DTSP 140 is unable to decrypt the encrypted reader blob 186 upon receipt from the source application 112 because the decryption keys (the transport server key and the rewrap backend private key) for the encrypted reader blob 186 may not be known to the DTSP 140. This is part of the security of the encryption for the transaction data. Similarly, the source application 112 may not have the keys to decrypt the encrypted reader blob 186. These features help ensure the security of the encrypted reader blob 186. However, the DTSP 140 can send the encrypted reader blob 186 to the rewrap backend 150 for decryption.

In some examples, the DTSP could be a payment service provider ("PSP") such as a bank (or, alternatively, a bank affiliate) or a corporate entity, such as an acquirer processor or a payment facilitator or aggregator, which is unlicensed or licensed as a non-bank financial institution (such as a money transmitter). Additionally, the transaction information can be transmitted as follows: (1) from a user through his or her payment device to the secure element in the source's (for example, merchant's) mobile device, (2) from the secure element to the card reader application; (3) from the card reader application to the source app via the frontend integration; (4) from the source app to the DTSP's payment system; (5) from the DTSP's payment system to the backend platform via the backend integration; (6) from the backend platform to the DTSP's payment system via the backend integration; (7) (a) if the DTSP is not an acquirer processor (for example, a payment facilitator or payment aggregator), from the DTSP to the acquirer processor to the payment network or (b) if the DTSP is an acquirer processor, from the DTSP directly to the payment network; (8) from the payment network to the issuing bank or issuer processor for authorization; and/or (9) with the authorization results sent back through the DTSP's system directly to the source app. In some implementations, neither the application/device provider nor the backend platform will see any of the consumer's sensitive payment information.

The rewrap backend 150 has access to the proper keys (the transport server key and the rewrap backend private key) to decrypt the encrypted reader blob 186. In some implementations, the rewrap backend 150 can use corresponding private keys (to the public keys used to encrypt the encrypted reader blob 186 and encrypted transaction blob 184) to decrypt the encrypted reader blob 186 and the encrypted transaction blob 184. The rewrap backend 150 can decrypt the encrypted transaction key used to encrypt the transaction data (encrypted by the rewrap backend public key) and reencrypt the decrypted transaction key with a backend KEK that the DTSP knows. The rewrap backend 150 can provide the rewrapped encrypted transaction data 190 back to the DTSP. This is called rewrapping and will be covered in more detail below. In some implementations, rewrapping can mean that the "transaction key" can be unwrapped by decrypting the transaction key via the rewrap backend private key (corresponding to the rewrap backend public key used to encrypt the transaction key) and rewrapped using a backend KEK. The DTSP is able to use a DTSP KEK (which corresponds to the backend KEK) to unwrap the transaction key. The DTSP is then able to use the transaction key to decrypt the transaction data. Once this process is complete, the DTSP can have the transaction data for the data transfer and can process the data transfer with a data transfer processor.

Once the rewrap backend 150 has decrypted the encrypted reader blob 186 certain verifications of the metadata in the encrypted reader blob 186 can be performed. If the verifications are validated, the rewrap backend 150 can then decrypt the encrypted transaction key of the encrypted transaction blob 184 using the rewrap backend private key. The rewrap backend 150 can rewrap the transaction key using a rewrap KEK (which corresponds to a DTSP KEK), generating rewrapped encrypted transaction data 190 from the encrypted transaction data and the rewrapped transaction key. In this way, the DTSP 140, which has access to their particular DTSP KEK (which corresponds to the rewrap KEK), can decrypt the rewrapped transaction key of the rewrapped encrypted transaction data 190. The rewrapped transaction key can then be used to decrypt the encrypted transaction data. The rewrapped encrypted transaction data 190 can also be referred to as the rewrapped transaction data or rewrapped transaction blob. This step of re-encrypting the transaction data on the rewrap backend 150 such that the transaction data is encrypted for the DTSP 140 to decrypt can be referred to as rewrapping. The rewrap backend 150 can include a hardware security module (HSM). Some or all of the encryption and decryption done on the rewrap backend 150 can be done in the HSM. Further description of the rewrap backend 150 and the processes performed by the rewrap process as described herein.

In some implementations, if the verifications are validated, the rewrap backend 150 can then decrypt the encrypted transaction key of the encrypted transaction blob 184 using the rewrap backend private key. In some implementations, the encrypted transaction data can be decrypted using the transaction key to verify/validate the transaction data. In some implementations, if the transaction data has been verified and/or validated, the rewrap backend 150 can encrypt the transaction key using a rewrap KEK (which corresponds to a DTSP KEK) and reencrypt the transaction data using the transaction key, generating rewrapped encrypted transaction data 190.

The DTSP 140 is then able to decrypt the rewrapped encrypted transaction data 190 upon receipt. In some implementations, some or all decryption of the rewrapped encrypted transaction data 190 happens on a DTSP-controlled HSM (DTSP HSM). The DTSP 140 can then process the transaction data. For example, the DTSP 140 can determine if the second data 182 is payment information and whether there are sufficient funds associated with the second data 182. The DTSP 140 can also send the transaction data to another party for processing, such as the data transfer processor 160. Once the DTSP 140 (or the data transfer processor 160) has processed the transaction data, the DTSP 140 is able to send an second data 182 to the source application 112. The authorization response 192 can indicate whether authorization is granted or denied for the transaction.

Once complete, a message that indicates whether the data transfer was approved or not can be sent back to the source application. Additionally other information pertaining to the source's day-to-day business operations (for example, user authorizations and transaction histories) can be sent directly between the DTSP and the source app.

Figure 2:
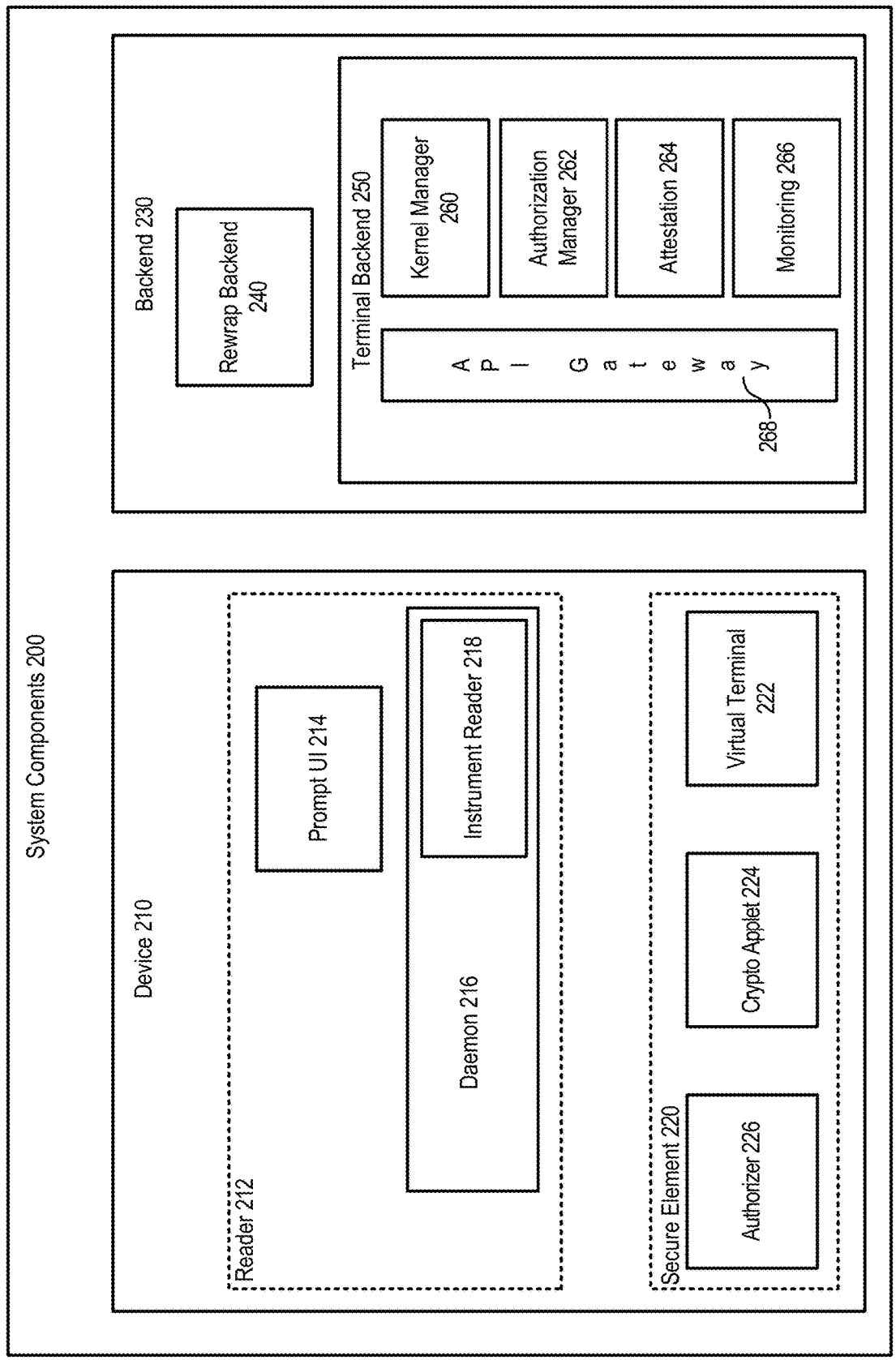
FIG. 2 illustrates a block diagram for illustrating the techniques described herein, according to an embodiment of the present disclosure.

FIG. 2 illustrates example system components 200. The system components can include components on the device 210 and components of the backend 230. The device 210 includes the reader 212 and the secure element 220. The reader 212 is hosted on the typical hardware of the device. For example, the reader 212 has access to the typical processor used for most or all applications also known as an application processor. Likewise, the reader 212 uses memory (for example, random access memory, short term memory, or volatile memory) and storage (for example, a solid-state drive or other long term storage or non-volatile storage) There is also a secure element 220 which hosts the virtual terminal 222, a cryptographic applet 224 (also referred to as "crypto applet 224" in FIG. 2), and an authorizer 226 (also referred to as an authorizer application). The backend 230 is representative of server devices or external devices to the multipurpose device. The device 210, the reader 212, the secure element 220, the virtual terminal 222, the rewrap backend 240, and the terminal backend 250 are equivalent to the device 110, the reader 120, the secure element 124, the virtual terminal 126, the rewrap backend 150, and the terminal backend 130 of FIG. 1, respectively.

In some implementations, the reader 212 is implemented in software using part or all of a hardware component of the multipurpose device. The reader 212 can be run on the processor of the device 210 alongside other applications and processes. For example, the reader 212 can be run on the application processor of the device 210. The reader 212 can also include encryption services as described herein.

The reader 212 includes a prompt UI 214. The prompt UI 214 is used to indicate that the virtual terminal 222 is ready to receive the second data from a user. For example, the prompt UI 214 can be used to indicate that a user should present the second data. In some implementations, the prompt UI 214 can be used to indicate that a user should swipe, tap, or insert a card or use some kind of digital wallet on a mobile device. The prompt UI 214 can be used to indicate where on the multipurpose device a user should present their second data. For example, the prompt UI 214 may indicate to a user where to tap their card on the multipurpose device.

The reader 212 also includes a daemon 216 and an instrument reader 218. The daemon 216 can be used to run the processes and generate data associated with the device 210 that are not handled by the secure element 220. The daemon 216 can also be used to process the second data obtained by the instrument reader 218. The instrument reader 218 is used to read the second data from the user and process the second data.

The device 210 also includes a secure element 220. The secure element 220 is an element designed for security on the multipurpose device. In some implementations, the secure element 220 is a separate chip or hardware module from a processor of the device. For example, the secure element 220 can be operating on a separate chip from the processor running the reader 212. In some implementations, the secure element 220 is a software module that includes additional software security features for running processes, whereas the reader 212 may not use those additional software security features. In some implementations, the secure element 220 is specifically used only by the device 210 and only runs processes associated with the device 210. In some implementations, the secure element 220 runs some processes associated with the device 210, and also runs processes for other applications on the multipurpose device that need additional security features.

The secure element 220 houses the virtual terminal 222, the cryptographic applet 224, and the authorizer 226. The secure element 220 can house multiple virtual terminals 222 which correspond to different pairs of source apps and DTSPs. The virtual terminal 222 has a virtual terminal kernel (also referred to as a terminal kernel) that is configurable by a kernel token. The virtual terminal 222 is designed to encrypt data. For example, the virtual terminal 222 encrypts transaction data generated from the second data and the first data. The virtual terminal 222 can employ many types of keys, hashes, and other cryptography when encrypting data. Examples of encryption done by the virtual terminal 222 are contained herein. The cryptographic applet 224 perform cryptographic operations. In some examples, the secure element 220 can host multiple cryptographic applets which may perform different cryptographic operations. In some examples, a cryptographic applet 224 can correspond to a source application. In some examples, a cryptographic applet 224 can correspond to a grouping of similar cryptographic operations. In some examples, a cryptographic applet 224 can be used by a virtual terminal 222 to perform cryptographic operations. The virtual terminal 222 can represent a terminal that was instantiated for the use of a source application and DTSP, while the cryptographic applet 224 can provide the cryptographic operations for encrypting, decrypting, and the like. The authorizer 226 can be an application in the secure element 220 that provides an authorization status for the types of cryptographic operations that the cryptographic applet 224 can perform. For example, the authorizer 226 can store digital flags that indicate whether a particular type of operation can be performed by the cryptographic applet 224. The authorizer 226 can set these flags based on authorization criteria received via an authorization token as described herein. The authorizer 226 can be configured to update the digital flags when the authorization criteria are no longer complied with. For example, authorization criteria can indicate a duration for which the cryptographic operation is authorized. In another example, the authorization criteria can indicate a number of times a cryptographic operation is authorized to be performed.

The backend 230 represents system components that may not be stored on the device 210. In some implementations, the backend 230 is representative of one or more devices, typically with server functionality. The backend 230 can include a rewrap backend 240 and a terminal backend 250. The terminal backend can include an API gateway 268, a kernel manager 260, an authorizer manager 262, an attestation subsystem 264, and a monitoring subsystem 266.

The rewrap backend 240 receives the encrypted transaction data (for example, the encrypted reader blob 186 of FIG. 1) from the DTSP, decrypts some or all the encrypted transaction data (for example, metadata of the encrypted reader blob 186 of FIG. 1 and the encrypted transaction key), verifies some or all of the transaction data (for example, the metadata of the encrypted reader blob 186 of FIG. 1), and then re-encrypts some or all the transaction data (for example, the transaction key after being decrypted using the rewrap backend private key) with a KEK associated with the DTSP. The rewrap backend 240 and the processes performed by the rewrap backend 240 are further described herein.

The API gateway 268 is used to mediate the interaction between the device 210 and the terminal backend 250. For example, the API gateway 268 mediates the communications, interactions, and transmission between the device 210 and the kernel manager 260, authorization manager 262, attestation subsystem 264, and the monitoring subsystem 266.

The kernel manager 260 can be used to create and generate kernel tokens. The kernel manager 260 can also be used to generate scripts for the configuration of virtual terminals 222 in the secure element 220 of the device 210.

The authorization manager 262 can be used to authorize DTSPs, sources, and devices to use the virtual terminal system. This ensures that only DTSPs, sources, and devices that have been accepted to use the virtual terminal system can use the techniques described herein. Authorization can include the use of tokens, keys, accounts, credentials, and the like.

The attestation subsystem 264 can be used to authorize and verify devices (for example, mobile devices and servers) using the virtual terminal system. The attestation subsystem 264 is part of security systems designed to prevent hacking or improper use of the virtual terminal system to create false transactions or hijack existing transactions. Hijacking transactions can include altering any transaction data related to a transaction such that the transaction data may not accurately match or correspond to the transaction.

The monitoring subsystem 266 can be used to monitor transactions and devices (for example, the virtual terminal 222 and the reader 212) using the virtual terminal system described herein. Monitoring transactions can be critical for compliance with CPOC and other regulations involving wire transfers, transactions, etc. and related devices.

Figure 3:
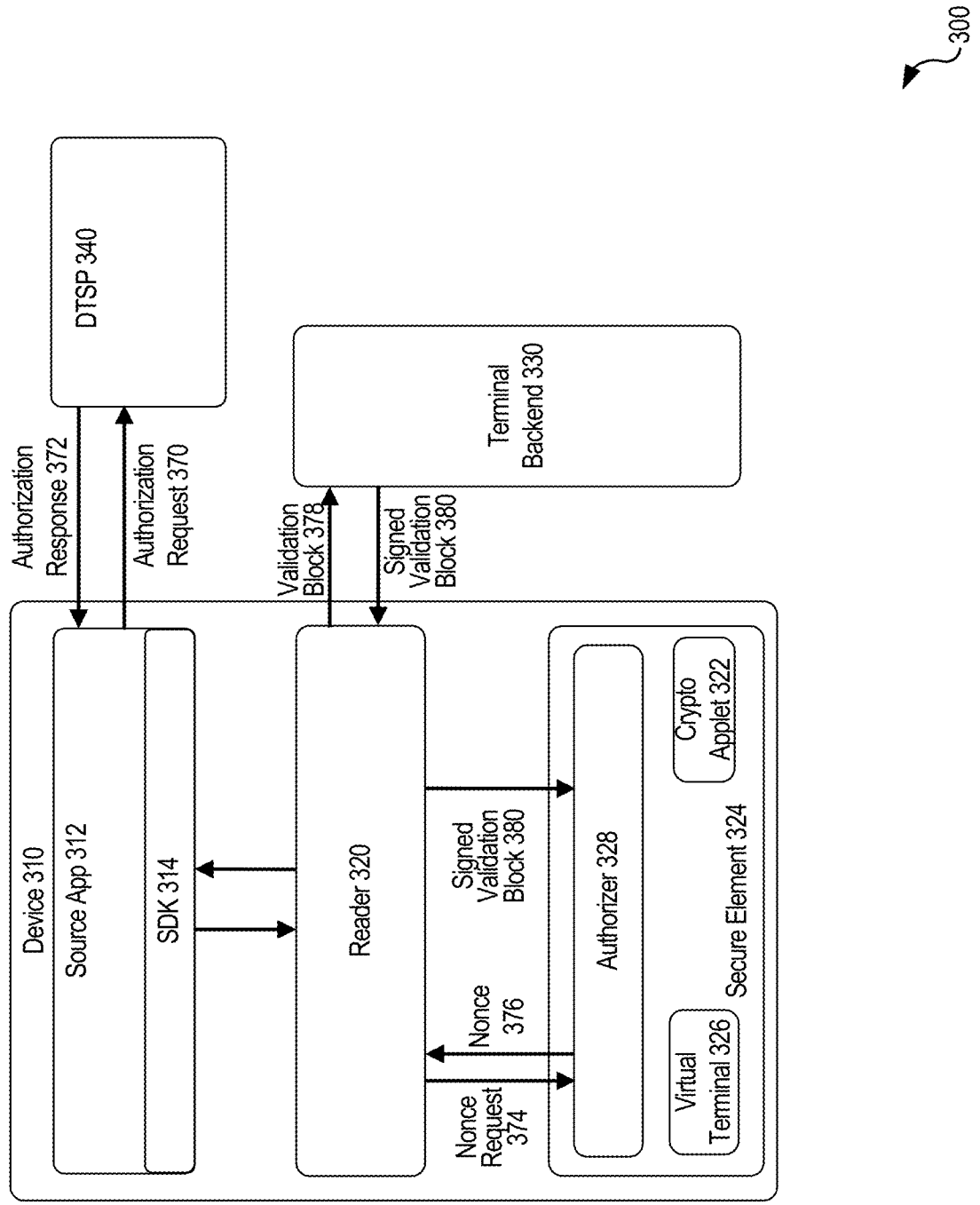
FIG. 3 illustrates a block diagram for illustrating the techniques described herein, according to an embodiment of the present disclosure.

FIG. 3 illustrates an example block diagram 300 with example systems and components for implementing the virtual terminal techniques described herein. The device 310 (for example, the device 110 of FIG. 1) includes a source application 312 (for example, the source application 112 of FIG. 1) which interacts with an SDK 314 (for example, the SDK 114 of FIG. 1) in order to send data to the reader 320 (for example, the reader 120 of FIG. 1). The source application 312 can also communicate with a DTSP (for example, the DTSP 140 of FIG. 1) for initialization of the authorizer 328 to authorize the secure element 324 to perform an operation. The virtual terminal 326 (for example, the virtual terminal 126 of FIG. 1) is hosted within a secure element 324 (for example, the secure element 124 of FIG. 1). The secure element 324 also hosts a cryptographic applet 322 (for example, the cryptographic applet 224 of FIG. 2). The secure element 324 also hosts the authorizer 328 (for example, the authorizer 225 of FIG. 2).

Figure 4:
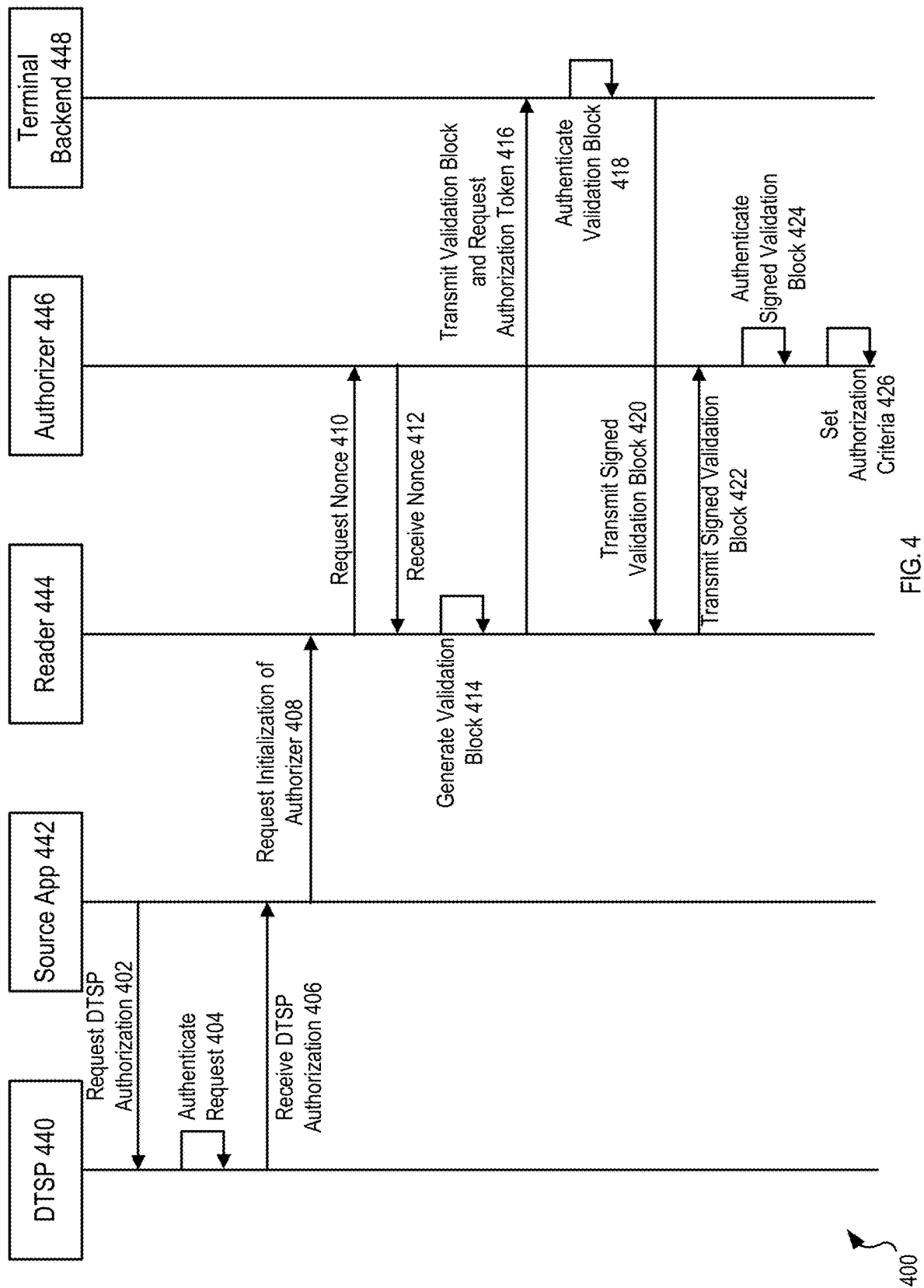
FIG. 4 illustrates a sequence diagram for performing the techniques described herein, according to an embodiment of the present disclosure.

FIG. 4 illustrates a sequence diagram 400 of an example high-level sequence for implementing the virtual terminal techniques described herein. The example sequence includes initializing an authorizer 446 which can authorize the secure element 324 and/or the cryptographic applet 322 of FIG. 3 to perform an operation. The sequence diagram 400 may describe operations between the systems and components of FIG. 3. The systems and components of FIG. 3 are described herein in conjunction with the operations of sequence diagram 400. The DTSP 440, the source application 442, the reader 444, the authorizer 446, and the terminal backend 448 of FIG. 4 correspond to the DTSP 340, the source application 312, the reader 320, the authorizer 328, and the terminal backend 330 of FIG. 3, respectively. The example sequence of sequence diagram 400 can be referred to as initializing the authorizer, setting the authorization criteria for an operation, and/or setting the authorization status of an operation. Example operations can include transmitting data for a data transfer, encrypting specific data, decrypting specific data, encrypting data with a specific key, decrypting data with a specific key, and generating a public key and private key pair for use in asymmetric cryptography.

At block 402, the source application 442 can request DTSP authorization 402 from the DTSP 440 to perform an operation. As shown in FIG. 3, the source application 312 can send an authorization request 370 to the DTSP 340. The authorization request 370 can include data regarding the operation for which the source application 312 seeks authorization. For example, the operation can be a data transfer which that includes the use of key A. Key A can be stored in the cryptographic applet 322 and/or in the secure element 324. Data regarding the operation can include key A and that the operation is a data transfer. The authorization request 370 can include metadata regarding the source application 312 and the device 310. The authorization request 370 can also include operation information. For example, if the operation is a data transfer as described in relation to FIG. 1, the authorization request 370 can include data transfer information and transaction information.

At block 404, the DTSP 440 can authenticate the authorization request 370. The DTSP 440 can examine the metadata of the authorization request 370 and the data regarding the operation for which the source application 442 is seeking authorization. The DTSP 440 can authenticate that a verified source application 442 is seeking authorization and that the source application 442 is able to be authorized to perform the particular operation. Once the DTSP 440 authenticates the authorization request 370 as being valid, the DTSP 440 can generate a DTSP authorization token. The DTSP authorization token can include data regarding the operation for which the source application 442 is seeking authorization. For example, the DTSP authorization token can indicate what operations are authorized. Continuing with the example operation of a data transfer which includes the use of key A, the DTSP authorization token can include the operation type (data transfer in this case) and the key A. Additionally, the DTSP authorization token can include one or more authorization criteria. The one or more authorization criteria can indicate the boundaries of the authorization. For example, the authorization criteria can include a number of times the operation can be performed. In another example, the authorization criteria can include a duration for which the operation is authorized to be performed. For example, the operation may be authorized to be performed for ten seconds, five minutes, one hour, one day, one week, or any amount of time in between, or any other increment of time. In some examples, the DTSP authorization token may not be include one or more authorization criteria. At block 406, the source application 442 can receive the DTSP authorization. As shown in FIG. 3, the DTSP 340 can send an authorization response 372 to the source application 312. The authorization response 372 can include the DTSP authorization token.

At block 408, the source application 442 can send a request to the reader 444 in order to initialize the authorizer 446. In some examples, this request can be referred to as an initialize authorizer request or an initialize authorizer application request. As shown in FIG. 3, the source application 312 can communicate with the reader 320 through the use of the SDK 314.

At block 410, the reader 444 can request a nonce from the authorizer 446. As shown in FIG. 3, the reader 320 can send a nonce request 374 to the authorizer 328 which is hosted by the secure element 324. The authorizer 328 can generate a nonce 376. The nonce 376 can be a random number or string. The nonce 376 can be used to identify that the authorization token is meant for the authorizer 328. In this way, the nonce 376 serves as a random identifier only known by the authorizer 328 and/or the secure element 324. In some examples, the nonce 376 can be encrypted. The authorizer 328 can store the nonce 376 for later comparison with the authorization token. The authorizer 328 can also start a timer associated with the nonce 376 such that an authorization token associated with the nonce 376 is valid only if received prior to the expiration of the timer associated with the nonce 376. At block 412, the reader 444 can receive the nonce 376 from the authorizer 446.

At block 414, the reader 444 can generate a validation block 378. In some examples, the validation block 378 can include the nonce 376. In some examples, the validation block 378 can include the DTSP authorization token. In some examples, the validation block 378 can include the one or more authorization criteria of the DTSP authorization token. In some examples, the validation block 378 can include device metadata. Device metadata can include the software version of the operating system of the device 310, software version of the operating system of the secure element 324, software version of the reader 320, and software version of the source application 312. Device metadata can also include a unique device identifier associated with the device 310 and/or a unique secure element identifier associated with the secure element 324. Device metadata can include location information for the device 310 such as global positioning system (GPS) coordinates.

At block 416, the reader 444 can transmit the validation block and request an authorization token from the terminal backend 448. As shown in FIG. 3, the reader 320 can send the validation block 378 to the terminal backend 330.

At block 418, the terminal backend 448 can authenticate the validation block. As shown in FIG. 3, the terminal backend 330 can authenticate the validation block 378. The terminal backend 330 can authenticate and/or validate the device metadata of the validation block 378. For example, the terminal backend 330 can determine if the validation block 378 from the device 310 has a valid combination of one or more of the following: the software version of the operating system of the device 310, software version of the operating system of the secure element 324, software version of the reader 320, and software version of the source application 312. In another example, the terminal backend 330 can determine if the validation block 378 of the device 310 has a valid unique device identifier associated with the device 310 and/or a unique secure element identifier associated with the secure element 324. For example, a user associated with the device 310 and/or the secure element 324 can report the device 310 and/or the secure element 324 as lost, hacked, or unsecure. In some examples the terminal backend 330 can verify that the device 310 is within a geographic boundary for valid use as a virtual terminal. The terminal backend 330 can also authenticate the DTSP authorization token. The terminal backend 330 can determine if the DTSP authorization token is valid and/or authentic. The terminal backend 330 can also determine if the DTSP authorization token corresponds to the device metadata. After authenticating the validation block 378 and the device metadata, the terminal backend 330 can generate an authorization token. The authorization token can indicate what operations are authorized. The authorization token can also include one or more authentication criteria. In some examples, the authorization token has the same one or more authentication criteria as the DTSP authorization token. In some examples, the authorization token has different authentication criteria than the DTSP authorization token. For example, the operations that are authorized can be the set or a subset of the operations authorized in the DTSP authorization token. In some examples, the terminal backend 330 can generate the authentication criteria for the authorization token. In some examples, the terminal backend 330 can have predefined authentication criteria for certain types of operations. The terminal backend 330 can generate a signed validation block 380. The signed validation block 380 can include the authorization token and the nonce 376. The signed validation block 380 can be signed and/or encrypted by a terminal backend private key. The terminal backend private key can correspond to an authorizer public key. The authorizer 328 can have the authorizer public key to decrypt the signed validation block 380.

At block 420, the terminal backend 448 can transmit the signed validation block to the reader 444. As shown in FIG. 3, the terminal backend 330 can transmit the signed validation block 380 to the reader 320. In some examples, the terminal backend 330 can transmit the signed validation block 380 to the secure element 324 and directly to the authorizer. At block 422, the reader 444 can transmit the signed validation block to the authorizer 446. As shown in FIG. 3, the reader 320 can transmit the signed validation block 380 to the authorizer 328.

At block 424, the authorizer 446 can authenticate the signed validation block 424. The authorizer 446 can authenticate the signed validation block by verifying the signature of the terminal backend 448. The authorizer 446 can decrypt the signed validation block with the authorizer public key corresponding to the terminal backend private key. The authorizer public key can be injected into the authorizer 446 and/or the secure element in a secure way prior to this verification and prior to the sequence diagram of 400. The authorizer 446 can then verify the nonce (for example, the nonce 376). The authorizer 446 can determine if the signed validation block contains a nonce and if the nonce matches a nonce that the authorizer 446 has previously generated. The authorizer 446 can also determine if the nonce is still valid, for example, if the associated timer has not yet expired.

At block 426, the authorizer 446 can set authorization criteria for the operation. The authorizer can determine the one or more authorization criteria for the operation from the authorization token in the signed validation block. The one or more authorization criteria dictate when the operation can be performed by a cryptographic applet (for example, the cryptographic applet 322) and/or the secure element. The one or more authorization criteria can indicate the boundaries of the authorization. For example, the authorization criteria can include a number of times the operation can be performed. In another example, the authorization criteria can include a duration for which the operation is authorized to be performed. For example, the operation may be authorized to be performed for ten seconds, five minutes, one hour, one day, one week, or any amount of time in between, or any other increment of time. The authorizer 446 can maintain an authorization status for the operation based on the authorization criteria. The authorization status can be authorized or unauthorized. When the authorizer 446 sets the authorization criteria for the operation, the authorizer 446 can set the authorization status to authorized. As long as there is compliance with the authorization criteria, the authorization status continues to be set at authorized. As soon as the authorizer 446 detects a lack of compliance with the authorization criteria, the authorization status becomes unauthorized. For example, if the duration for the authorization expires or the operation occurs the authorized number of times, the authorization status for the operation becomes unauthorized.

Figure 5:
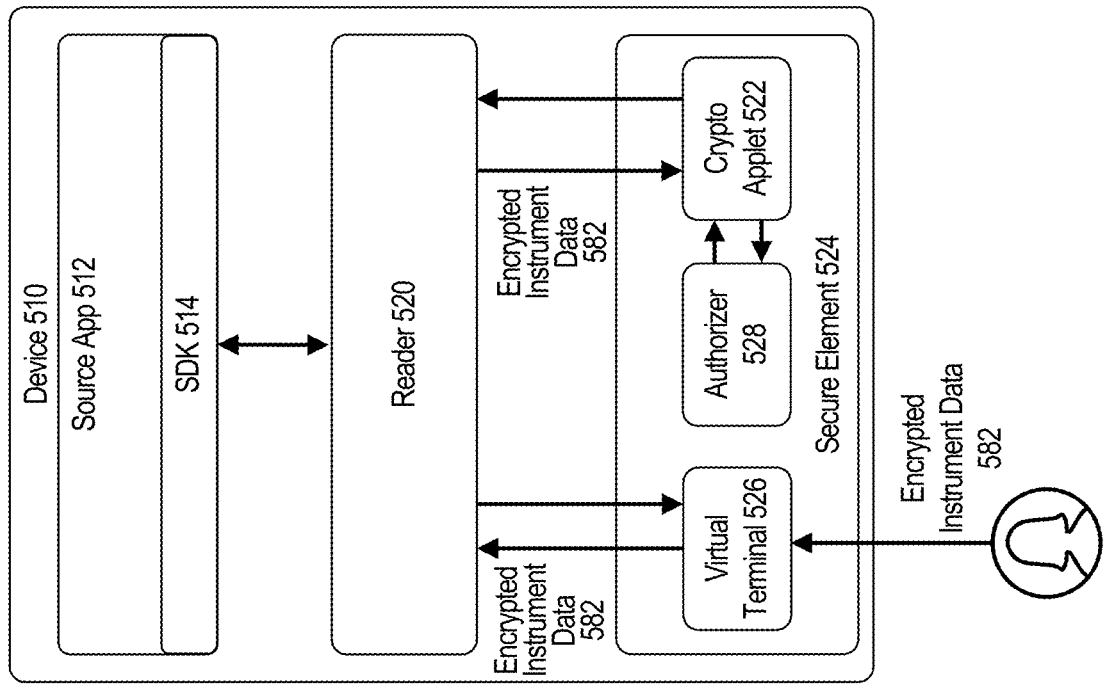
FIG. 5 illustrates a block diagram for performing the techniques described herein, according to an embodiment of the present disclosure.

FIG. 5 illustrates an example block diagram 500 with example systems and components for implementing the virtual terminal techniques described herein. The device 510 (for example, the device 310 of FIG. 3) includes a source application 512 (for example, the source application 312 of FIG. 3) which interacts with an SDK 514 (for example, the SDK 314 of FIG. 3) in order to send data to the reader 520 (for example, the reader 320 of FIG. 3). The source application 312 can also communicate, through the reader 520, to the secure element 524 to perform an operation. The virtual terminal 526 (for example, the virtual terminal 326 of FIG. 3) is hosted within a secure element 524 (for example, the secure element 324 of FIG. 3). The secure element 524 also hosts a cryptographic applet 522 (for example, the cryptographic applet 322 of FIG. 3). The secure element 524 also hosts the authorizer 528 (for example, the authorizer 328 of FIG. 3).

Figure 6:
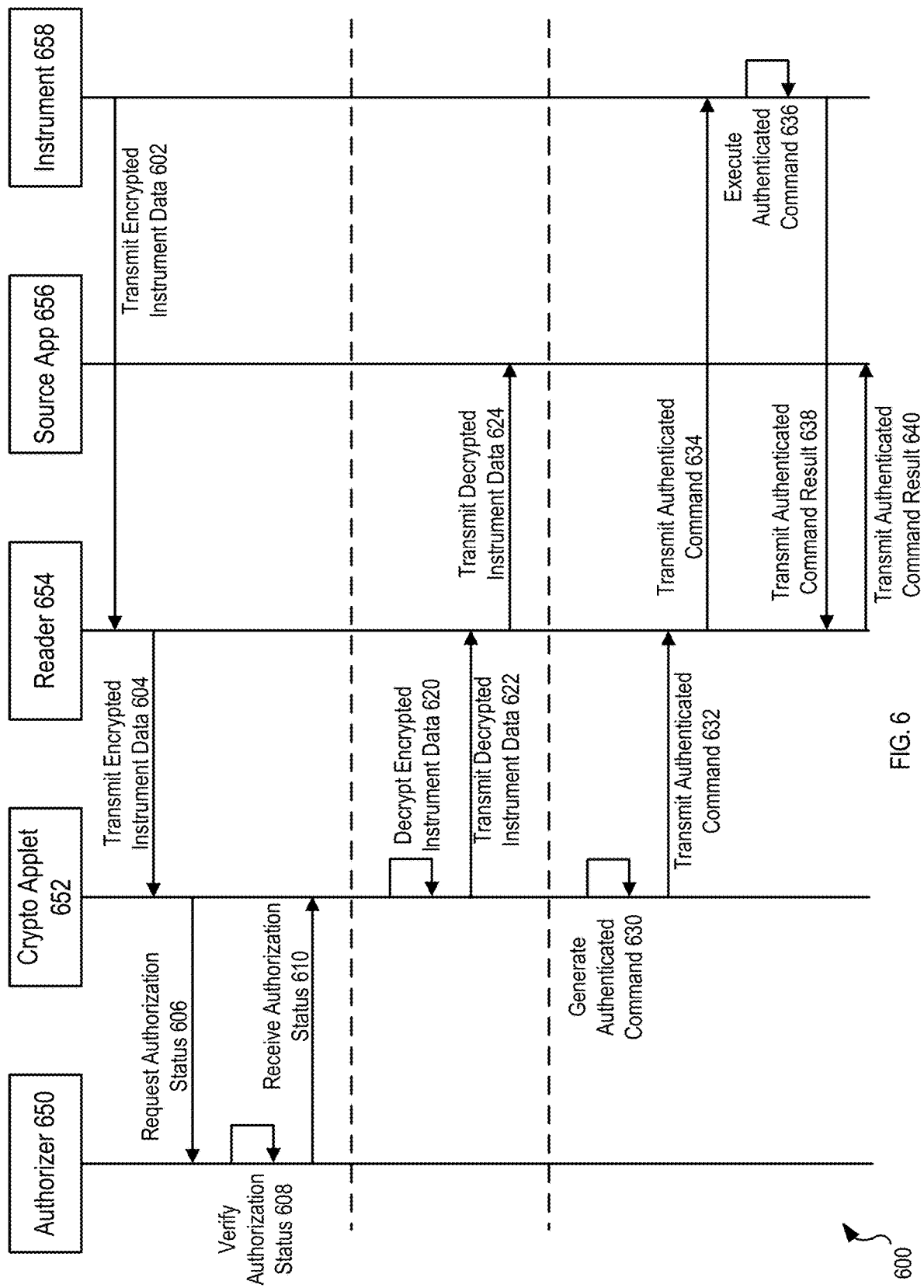
FIG. 6 illustrates a sequence diagram for performing the techniques described herein, according to an embodiment of the present disclosure.

FIG. 6 illustrates a sequence diagram 600 of an example high-level sequence for implementing the virtual terminal techniques described herein. The example sequence includes the cryptographic applet 652 requesting the authorization status for an operation prior to performing the operation. The sequence diagram 600 may describe operations between the systems and components of FIG. 5. The systems and components of FIG. 5 are described herein in conjunction with the operations of sequence diagram 600. The authorizer 650, the cryptographic applet 652, the reader 654, and the source application 656 of FIG. 6 correspond to the authorizer 528, the cryptographic applet 522, the reader 520, and the source application 512 of FIG. 5, respectively. The example sequence of sequence diagram 600 can be referred to as verifying the authorization status of the operation.

Prior to block 602, the reader 654 or the source application 656 can indicate an operation to be performed that includes an operation to be performed by the cryptographic applet 652. At block 602, the instrument 658 can transmit encrypted instrument data to the reader 654 for use in the operation. As shown in FIG. 5, in some examples, the encrypted instrument data 582 can be transmitted to the virtual terminal 526 which can transmit the encrypted instrument data 582 to the reader 520. In some examples, the instrument 658 can directly transmit the encrypted instrument data to the reader 654. As described herein, the instrument 658 can be a card with data such as a credit card, debit card, or other digital data-holding card. In this example, the instrument data can be encrypted with a public key. The corresponding private key can be in the cryptographic applet 652. At block 604, the reader 654 can transmit the encrypted instrument data to the cryptographic applet 652.

At block 606, the cryptographic applet 652 can request the authorization status for the operation from the authorizer 650. As shown in FIG. 5, the cryptographic applet 522 can request the authorization status from the authorizer 528. At block 608, the authorizer 650 can verify the authorization status of the operation. For example, the authorizer 650 can verify if the authorization status for the operation is authorized or unauthorized. As described in relation to FIG. 4, the authorization status for the operation can previously be initialized with authorization criteria. As soon as the authorizer 650 detects a lack of compliance with the authorization criteria for an operation, the authorizer 650 sets the authorization status for the operation to unauthorized. At block 610, the authorizer 650 can transmit the authorization status of the operation to the cryptographic applet. In other words, the cryptographic applet 652 can receive the authorization status of the operation.

Blocks 620, 622, and 624 demonstrate an example operation by the cryptographic applet 652 to decrypt the instrument data of instrument 658. At block 620, the cryptographic applet 652 can decrypt the encrypted instrument data after determining that the authorization status for decrypting the encrypted instrument data is authorized. As described herein, the authorization status and operation can be associated with decrypting specific data such as the encrypted instrument data. Alternatively, the authorization status and operation can be associated with using a specific key to decrypt the encrypted instrument data. For example, the encrypted instrument data may be encrypted with a public key of the instrument 658 which corresponds to the private key of the cryptographic applet 652. The decryption of the encrypted instrument data can generate decrypted instrument data. At block 622, the cryptographic applet 652 can transmit the decrypted instrument data to the reader 654. At block 624, the reader 654 can transmit the decrypted instrument data to the source application 656.

Blocks 630, 632, 634, 636, 638, and 640 demonstrate an example operation by the cryptographic applet 652 to generate an authenticated command for the instrument 658. At block 630, the cryptographic applet 652 can generate an authenticated command after determining that the authorization status for generating an authenticated command is authorized. The authenticated command can include an operation for the instrument to perform. For example, the authenticated command can indicate that the instrument 658 should transfer data to the source application 656. For example, the instrument 658 may have a store of value (for example, digital currency or any currency) that can be transferred to the source application 656. The cryptographic applet 652 can encrypt the authenticated command with a private key corresponding to a public key on the instrument 658. IN some examples, the cryptographic applet 652 can encrypt the authenticated command with a public key corresponding to a private key on the instrument 658. In this way, both the cryptographic applet 652 and the instrument 658 authenticate the authenticated command. This can be referred to as mutual authentication.

At block 632, the cryptographic applet 652 can transmit the authenticated command to the reader 654. At block 634, the reader 654 can transmit the authenticated command to the instrument 658. At block 636, the instrument 652 can execute the authenticated command after verifying the authenticity of the authenticated command. For example, the instrument 658 can decrypt the authenticated command using the public key of the instrument 658 corresponding to the private key of the cryptographic applet 652. In some examples, the instrument 658 can decrypt the authenticated command using the private key of the instrument 658 corresponding to the public key of the cryptographic applet 652. The instrument 658 can also verify other metadata in the authenticated command to verify that the cryptographic applet 652 is valid. The instrument 652 can execute the authenticated command to generate an authenticated command result. For example, the instrument 652 can perform a data transfer of value to the source application 656 based on the authenticated command. At block 638, the instrument 658 can transmit the authenticated command result to the reader 654. At block 640, the reader 654 can transmit the authenticated command result to the source application 656.

Figure 7:
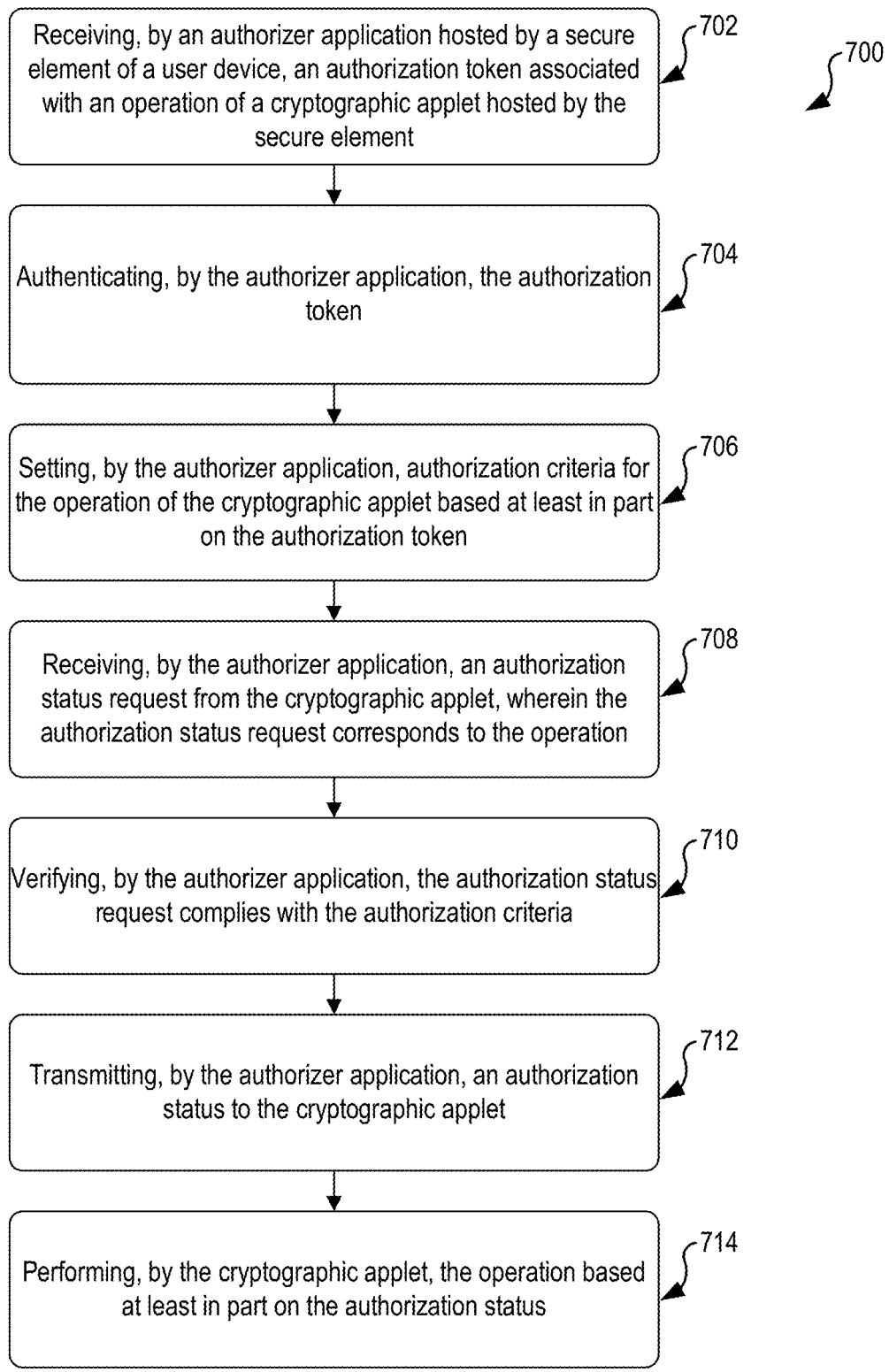
FIG. 7 illustrates a flow diagram for performing the techniques described herein, according to an embodiment of the present disclosure.

FIG. 7 illustrates a flow chart showing an example process 700 for techniques described herein is shown according to at least one example. Process 700 is illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At block 702, process 700 can include receiving, by an authorizer application (for example, the authorizer 328 of FIG. 3) hosted by a secure element (for example, the secure element 324 of FIG. 3) of a user device (for example, the device 310 of FIG. 3). The secure element can be a hardware module configured for security and cryptography associated with one or more processors and one or more memories. The secure element can be separate from a reader application (for example, the reader 320 of FIG. 1), and a second one or more memories, and a second one or more processors of the user device. The authorization token can be associated with an operation of a cryptographic applet (for example, the cryptographic applet 322 of FIG. 3) hosted by the secure element. A first server (for example, the terminal backend 330 of FIG. 3) can be configured to generate the authorization token.

At block 704, process 700 can include authenticating, by the authorizer application, the authorization token. At block 706, process 700 can include setting, by the authorizer application, authorization criteria for the operation of the cryptographic applet based at least in part on the authorization token. The authorization criteria can include an authorization duration. The authorization criteria can include a number of times the operation is authorized to be performed.

At block 708, process 700 can include receiving, by the authorizer application, an authorization status request from the cryptographic applet. The authorization status request can correspond to the operation. At block 710, process 700 can include verifying, by the authorizer application, the authorization status request complies with the authorization criteria.

At block 712, process 700 can include transmitting, by the authorizer application, an authorization status to the cryptographic applet. At block 714, process 700 can include performing, by the cryptographic applet, the operation based at least in part on the authorization status.

Process 700 can further include generating, by the authorizer application, a nonce. Authenticating the authorization token can be based at least in part on the nonce. Process 700 can further include transmitting, by the authorizer application, the nonce, to a reader application of the user device. Process 700 can further include transmitting, by the reader application, the nonce to the first server. The first server can be configured to generate the authorization token based at least in part on the nonce. Process 700 can further include transmitting, by a reader application of the user device, device information to the first server. The first server can be configured to generate the authorization token based at least in part on the device information. Process 700 can further include transmitting, by a reader application of the user device, a data transfer service provider authorization request to a second server (for example, the DTSP 340 of FIG. 3). Process 700 can further include receiving, by the reader application, a data transfer service provider authorization token from the second server. Process 700 can further include transmitting, by the reader application, the data transfer service provider authorization token to the first server. The first server is configured to generate the authorization token based at least in part on the data transfer service provider authorization token. In some examples, the data transfer service provider authorization token can include at least a portion of the authorization criteria.

Illustrative methods, systems, and computer-readable media for enabling a virtual terminal for receiving touchless data transfers on a mobile device are described above. Some or all of these systems and methods may, but need not, be implemented at least partially by architectures such as those shown at least in FIGS. 1-7. While many of the examples are described above with reference to personal and/or payment-related information, it should be understood that any type of user information or non-user information (for example, data of any type) may be managed using these techniques. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

Figure 8:
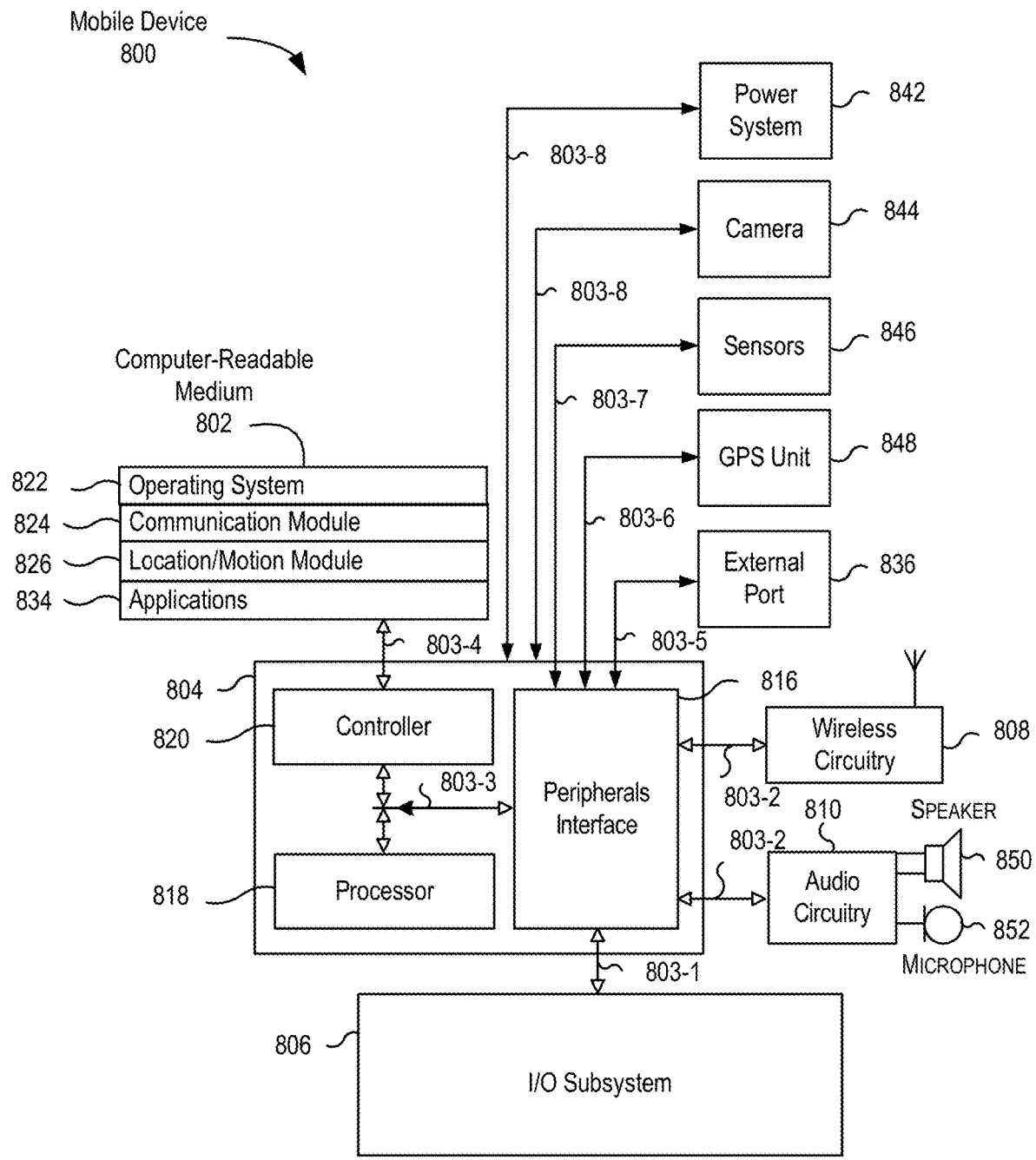
FIG. 8 illustrates an example architecture or environment configured to implement the techniques described herein, according to an embodiment of the present disclosure.

FIG. 8 is a block diagram of an example electronic device 800. Device 800 generally includes computer-readable medium 802, a processing system 804, an Input/Output (I/O) subsystem 806, wireless circuitry 808, and audio circuitry 810 including speaker 812 and microphone 814. These components may be coupled by one or more communication buses or signal lines 803. Device 800 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 8 is only one example of an architecture for device 800, and that device 800 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 808 can use various protocols, for example, as described herein. In various embodiments, wireless circuitry 808 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VOIP), near field communication protocol (NFC), a protocol for email, instant messaging, and/or a short message service (SMS), or any other suitable communication protocol, including communication protocols not yet developed as of the filing date of this document.

Wireless circuitry 808 is coupled to processing system 804 via peripherals interface 816. Peripherals interface 816 can include conventional components for establishing and maintaining communication between peripherals and processing system 804. Voice and data information received by wireless circuitry 808 (for example, in speech recognition or voice command applications) is sent to one or more processors 818 via peripherals interface 816. One or more processors 818 are configurable to process various data formats for one or more application programs 834 stored on medium 802.

Peripherals interface 816 couple the input and output peripherals of device 800 to the one or more processors 818 and computer-readable medium 802. One or more processors 818 communicate with computer-readable medium 802 via a controller 820. Computer-readable medium 802 can be any device or medium that can store code and/or data for use by one or more processors 818. Computer-readable medium 802 can include a memory hierarchy, including cache, main memory and secondary memory. The memory hierarchy can be implemented using any combination of a random-access memory (RAM) (for example, static random access memory (SRAM), dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 816, one or more processors 818, and controller 820 can be implemented on a single chip, such as processing system 804. In some other embodiments, they can be implemented on separate chips.

Processor(s) 818 can include hardware and/or software elements that perform one or more processing functions, such as mathematical operations, logical operations, data manipulation operations, data transfer operations, controlling the reception of user input, controlling output of information to users, or the like. Processor(s) 818 can be embodied as one or more hardware processors, microprocessors, microcontrollers, field programmable gate arrays (FPGAs), application-specified integrated circuits (ASICs), or the like. As noted above, the secure element 324 of FIG. 3 is separate from the processor 818 contemplated here.

Device 800 also includes a power system 842 for powering the various hardware components. Power system 842 can include a power management system, one or more power sources (for example, battery, alternating current (AC)), a recharging system, a power failure detection circuit, a power converter or inverter, a power status indicator (for example, a light emitting diode (LED)) and any other components typically associated with the generation, management and distribution of power in mobile devices.

In some embodiments, device 800 includes a camera 844. In some embodiments, device 800 includes sensors 846. Sensors can include accelerometers, compass, gyrometer, pressure sensors, audio sensors, light sensors, barometers, and the like. Sensors 846 can be used to sense location aspects, such as auditory or light signatures of a location.

In some embodiments, device 800 can include a GPS receiver, sometimes referred to as a GPS unit 848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for device 800. In some embodiments, the software components include an operating system 822, a communication module 824 (or set of instructions), a location module 826 (or set of instructions), and other application programs 834 (or set of instructions).

Operating system 822 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (for example, memory management, storage device control, power management, etc.) and facilitates communication between various hardware and software components.

Communication module 824 facilitates communication with other devices over one or more external ports 836 or via wireless circuitry 808 and includes various software components for handling data received from wireless circuitry 808 and/or external port 836. External port 836 (for example, universal serial bus (USB), FireWire, Lightning connector, 60-pin connector, etc.) is adapted for coupling directly to other devices or indirectly over a network (for example, the Internet, wireless local area network (LAN), etc.).

Location/motion module 826 can assist in determining the current position (for example, coordinates or other geographic location identifiers) and motion of device 800. Modern positioning systems include satellite-based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position of the mobile device. In some embodiments, location/motion module 826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (for example, Cell ID database, Wi-Fi reference database) that maps or correlates the transmitter IDs to position coordinates of corresponding transmitters, and computes estimated position coordinates for device 800 based on the position coordinates of the corresponding transmitters. Regardless of the specific location technology used, location/motion module 826 receives information from which a location fix can be derived, interprets that information, and returns location information, such as geographic coordinates, latitude/longitude, or other location fix data.

The one or more applications 834 on device 800 can include any applications installed on the device 800, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), the reader 320 of FIG. 3, the PIN User interface 322 of FIG. 3, the source application 312 of FIG. 3, etc. As noted above, different applications can be installed in the secure element 324 of FIG. 3. For example, the authorizer 328 and the cryptographic applet 322 of FIG. 3 can be applications installed in the secure element 324 of FIG. 3. These applications in the secure element 324 of FIG. 3 are installed by the device manufacturer and may not be added and/or removed by the end user.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 806 can be coupled to a display system (not shown), which can be a touch-sensitive display. The display displays visual output to the user in a graphical user interface (GUI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or trackpad. In some embodiments, I/O subsystem 806 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 806 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 800 can include a touchpad (not shown) for activating or deactivating particular functions. In some embodiments, the touchpad is a touch-sensitive area of the device that, unlike the touch screen, may not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (for example, via Internet download). Any such computer readable medium may reside on or within a single computer program product (for example, a hard drive or an entire computer system), and may be present on or within different computer program products within a system or network. A computer system may include a monitor, printer, or other suitable display for providing any of the results mentioned herein to a user.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, for example, via Internet download. Any such computer readable medium may reside on or within a single computer product (for example, a solid-state drive, a hard drive, a CD, or an entire computer system), and may be present on or within different computer products within a system or network. A computer system may include a monitor, printer, or other suitable display for providing any of the results mentioned herein to a user.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (for example, meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (for example, "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (for example, X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is sharing personal and/or payment-related data between user devices, which may include storing some aspect of the data on a server. The present disclosure contemplates that in some instances, this gathered data may include personally identifiable information (PII) data that uniquely identifies or can be used to contact or locate a specific person. Such personal information data can include demographic data, location-based data, telephone numbers, email addresses, Twitter IDs, home addresses, data or records relating to a user's credit card information, date of birth, or any other identifying or personal or health information.

The present disclosure recognizes that the use of such personal information data, in the present technology, can be used to the benefit of users. For example, the personal information data can be used to process a data transfer or to pay for a transaction with a source. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services or other services relating to health record management, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (for example, date of birth), controlling the amount or specificity of data stored (for example, collecting location data at a city level rather than at an address level), controlling how data is stored (for example, aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:
   receiving, by an authorizer application hosted by a secure element of a user device, an authorization token associated with an operation of a cryptographic applet hosted by the secure element;
   authenticating, by the authorizer application, the authorization token;
   setting, by the authorizer application, authorization criteria for the operation of the cryptographic applet based at least in part on the authorization token;
   receiving, by the authorizer application, an authorization status request from the cryptographic applet, wherein the authorization status request corresponds to the operation;
   verifying, by the authorizer application, that the authorization status request complies with the authorization criteria;
   transmitting, by the authorizer application, an authorization status to the cryptographic applet;
   performing, by the cryptographic applet, the operation based at least in part on the authorization status;
   generating, by the authorizer application, a nonce, wherein authenticating the authorization token is based at least in part on the nonce;
   transmitting, by the authorizer application, the nonce, to a reader application of the user device; and
   transmitting, by the reader application, the nonce to a first server, wherein the first server is configured to generate the authorization token based at least in part on the nonce.

2. The method of claim 1, wherein the authorization criteria includes an authorization duration.

3. The method of claim 1, wherein the authorization criteria includes a number of times the operation is authorized to be performed.

4. The method of claim 1, further comprising transmitting, by a reader application of the user device, device information to the first server, wherein the first server is configured to generate the authorization token based at least in part on the device information.

5. The method of claim 1, further comprising:
   transmitting, by a reader application of the user device, a data transfer service provider authorization request to a second server;
   receiving, by the reader application, a data transfer service provider authorization token from the second server; and
   transmitting, by the reader application, the data transfer service provider authorization token to the first server, wherein the first server is configured to generate the authorization token based at least in part on the data transfer service provider authorization token.

6. The method of claim 5, wherein the data transfer service provider authorization token includes at least a portion of the authorization criteria.

7. A user device, comprising:
   a secure element with one or more memories and one or more processors in communication with the one or more memories and configured to execute instructions stored in the one or more memories to cause the secure element to:
   receive, by an authorizer application of the secure element, an authorization token associated with an operation of a cryptographic applet hosted by the secure element;
   authenticate, by the authorizer application, the authorization token;
   set, by the authorizer application, authorization criteria for the operation of the cryptographic applet based at least in part on the authorization token;
   receive, by the authorizer application, an authorization status request from the cryptographic applet, wherein the authorization status request corresponds to the operation;
   verify, by the authorizer application, that the authorization status request complies with the authorization criteria;
   transmit, by the authorizer application, an authorization status to the cryptographic applet;
   perform, by the cryptographic applet, the operation based at least in part on the authorization status;
   a second one or more memories; and
   a second one or more processors in communication with the second one or more memories and configured to execute instructions stored in the second one or more memories, and wherein the secure element is a hardware module configured for security and cryptography, and wherein the secure element is separate from a reader application, the second one or more memories, and the second one or more processors;
   wherein the one or more processors are further configured to:
   generate, by the authorizer application, a nonce, wherein authenticating the authorization token is based at least in part on the nonce;
   transmit, by the authorizer application, the nonce, to a reader application of the user device; and
   wherein, the second one or more processors are further configured to transmit, by the reader application, the nonce to a first server, wherein the first server is configured to generate the authorization token based at least in part on the nonce.

8. The user device of claim 7, wherein the second one or more processors are further configured to transmit, by the reader application, device information to the first server, wherein the first server is configured to generate the authorization token based at least in part on the device information.

9. The user device of claim 7, wherein the second one or more processors are further configured to:
transmit, by the reader application, a data transfer service provider authorization request to a second server;
receive, by the reader application, a data transfer service provider authorization token from the second server; and
transmit, by the reader application, the data transfer service provider authorization token to the first server, wherein the first server is configured to generate the authorization token based at least in part on the data transfer service provider authorization token.

10. A non-transitory computer-readable storage medium having stored thereon program instructions that, when executed by one or more processors of a user device, cause the user device to perform operations, comprising:
receiving, by an authorizer application hosted by a secure element of a user device, an authorization token associated with an operation of a cryptographic applet hosted by the secure element;
authenticating, by the authorizer application, the authorization token;
setting, by the authorizer application, authorization criteria for the operation of the cryptographic applet based at least in part on the authorization token;
receiving, by the authorizer application, an authorization status request from the cryptographic applet, wherein the authorization status request corresponds to the operation;
verifying, by the authorizer application, that the authorization status request complies with the authorization criteria;
transmitting, by the authorizer application, an authorization status to the cryptographic applet;
performing, by the cryptographic applet, the operation based at least in part on the authorization status;
generating, by the authorizer application, a nonce, wherein authenticating the authorization token is based at least in part on the nonce;
transmitting, by the authorizer application, the nonce, to a reader application of the user device; and
transmitting, by the reader application, the nonce to a first server, wherein the first server is configured to generate the authorization token based at least in part on the nonce.

11. The non-transitory computer-readable storage medium of claim 10, wherein the authorization criteria includes a number of times the operation is authorized to be performed.

12. The non-transitory computer-readable storage medium of claim 10, further comprising transmitting, by a reader application of the user device, device information to the first server, wherein the first server is configured to generate the authorization token based at least in part on the device information.

13. The non-transitory computer-readable storage medium of claim 10, further comprising:
transmitting, by a reader application of the user device, a data transfer service provider authorization request to a second server;
receiving, by the reader application, a data transfer service provider authorization token from the second server; and
transmitting, by the reader application, the data transfer service provider authorization token to the first server, wherein the first server is configured to generate the authorization token based at least in part on the data transfer service provider authorization token.

* * * * *